United States Patent
Lacouture et al.

(10) Patent No.: US 11,463,251 B2
(45) Date of Patent: Oct. 4, 2022

(54) METHOD FOR SECURE MANAGEMENT OF SECRETS IN A HIERARCHICAL MULTI-TENANT ENVIRONMENT

(71) Applicant: GEMALTO SA, Meudon (FR)

(72) Inventors: Dominique Lacouture, Meudon (FR); Patrick Lambert, Meudon (FR); Daniel Rocha Furtado, Meudon (FR)

(73) Assignee: THALES DIS FRANCE SAS, Meudon (FR)

( * ) Notice: Subject to any disclaimer, the term of this patent is extended or adjusted under 35 U.S.C. 154(b) by 277 days.

(21) Appl. No.: 16/470,358

(22) PCT Filed: Dec. 14, 2017

(86) PCT No.: PCT/EP2017/082779
§ 371 (c)(1),
(2) Date: Jun. 17, 2019

(87) PCT Pub. No.: WO2018/114574
PCT Pub. Date: Jun. 28, 2018

(65) Prior Publication Data
US 2020/0092096 A1    Mar. 19, 2020

(30) Foreign Application Priority Data
Dec. 19, 2016   (EP) ..................... 16205091

(51) Int. Cl.
H04L 9/08          (2006.01)
(52) U.S. Cl.
CPC .......... H04L 9/0894 (2013.01); H04L 9/0866 (2013.01); H04L 9/0897 (2013.01)
(58) Field of Classification Search
CPC .... H04L 9/0894; H04L 9/0866; H04L 9/0897
See application file for complete search history.

(56) References Cited

U.S. PATENT DOCUMENTS 8,291,490 B1    10/2012   Ahmed et al.
9,172,532 B1 *  10/2015   Fuller ................... H04L 9/0894
(Continued)

FOREIGN PATENT DOCUMENTS

WO    WO2016048266 A1    3/2016

OTHER PUBLICATIONS

PCT/EP2017/082779, International Search Report, dated Mar. 23, 2018, European Patent Office, P.B. 5818 Patentlaan 2 NL—2280 HV Rijswijk.
(Continued)

*Primary Examiner* — Noura Zoubair
(74) *Attorney, Agent, or Firm* — The Jansson Firm; Pehr B. Jansson

(57) ABSTRACT

The present invention relates to a method of securely using a first tenant secret key stored under an encrypted form in a first token (TKA) of a first tenant (A) identified by a first tenant identifier ($UID_A$) and having said first tenant secret key, wherein: each tenant identifier ($UID_T$) for a tenant (T) comprises a first value and, when said tenant (T) is allowed to use a secret key of a parent tenant (Tp) identified by a parent tenant identifier ($UID_{Tp}$), said parent tenant identifier, appended before said first value, and said first token (TKA) has been generated from said first tenant identifier ($UID_A$) and a first tenant secret key encrypted with said first tenant identifier ($UID_A$) and with a first tenant customer master key ($CMK_A$), said first tenant customer master key ($CMK_A$) having been derived from said first tenant identifier ($UID_A$) and a secure domain master key (SDMK), said method comprising the following steps performed by a secure device storing said secure domain master key (SDMK), on request of a second tenant (B) identified by a second tenant identifier ($UID_B$): —getting a first tenant identifier ($UID_A$) of said first tenant (A) from said first token (TKA), —checking if the
(Continued)

first tenant identifier ($UID_A$) is a prefix of or is equal to said second tenant identifier ($UID_B$), —when said first tenant identifier ($UID_A$) is a prefix of or is equal to said second tenant identifier ($UID_B$), recovering said first tenant secret key stored in said first token (TKA) and using it for the second tenant (B).

15 Claims, 8 Drawing Sheets

(56) References Cited

U.S. PATENT DOCUMENTS

| | | | | |
|---|---|---|---|---|
| 9,774,586 | B1* | 9/2017 | Roche | G06F 21/6218 |
| 2009/0225986 | A1* | 9/2009 | Gennaro | H04L 9/0836 |
| | | | | 380/278 |
| 2014/0122866 | A1* | 5/2014 | Haeger | H04L 63/061 |
| | | | | 713/153 |
| 2016/0350091 | A1* | 12/2016 | Khot | G06F 16/9024 |
| 2018/0062835 | A1* | 3/2018 | Hamel | H04L 9/0894 |

OTHER PUBLICATIONS 16205091.8, European Search Report, dated Jun. 9, 2017, Munich.
PCT/EP2017/082779, Written Opinion of the International Searching Authority, dated Mar. 23, 2018, European Patent Office, D-80298 Munich, Germany.
M G Jaatun, et al: "Identity-Based Authentication for Cloud Computing", LNCS, (Jan. 1, 2009), pp. 157-166, XP055373513, Retrieved from the Internet: URL:http://rd.springer.com/content/pdf/10.1007/978-3-642-10665-1_14.pdf [retrieved on Jun. 7, 2017] *abstract* * p. 2, line 17-p. 3, line 22; figure 1* *p. 4, line 23—p. 6, line 5; figure 2*.

* cited by examiner

METHOD FOR SECURE MANAGEMENT OF SECRETS IN A HIERARCHICAL MULTI-TENANT ENVIRONMENT

FIELD OF THE INVENTION

The present invention relates to the management of secrets in a multi-tenant environment, and more particularly to a method enabling a one-way only sharing of secrets between tenants of a hierarchical environment.

BACKGROUND OF THE INVENTION

Cryptographic applications rely on elements, such as secret keys, whose secrecy must be ensured in order to prevent any fraudulent operation. In a multi-tenant environment where multiple tenants interact, each tenant owning his own secrets, such as in the banking sector or telecom sector, there is a need for a strong segregation of such secrets. Secrets of a tenant shall generally neither be revealed to other tenants, nor used by them. Such a segregation may be achieved by storing and using such secrets in secure devices only such as smart cards or SIM cards.

In some case several tenants may need to share secrets, in order to enable these tenants at least to use common secrets, such as using secret keys for cryptographic applications.

Existing solutions usually enable a two-way permeability of secrets in which tenants share their secrets with each other. But a controlled one way permeability of secrets is sometimes needed, in which a first tenant may use the secret of another tenant, without letting this other tenant use the secrets of the first tenant. Such a case may particularly arise in hierarchical multi-tenants environments in which a tenant may be a sub-tenant of another tenant. For example, in the banking sector one tenant may be a national bank. Each regional subsidiary of this national bank may be a sub-tenant of the national bank. In such a hierarchical environment, the national bank and each subsidiary may have its own secret key. It may be needed that each subsidiary may use the secret key of its parent tenant, the national bank, without letting the national bank use the secret key of any of its sub-tenants or letting a sub-tenant use the secret key of another sub-tenant. Existing solutions dealing with hierarchical environment usually maintain a hierarchical database of tenants in order to be able to determine the existing hierarchical relationship between two tenant and the corresponding permeability rights. The size of such a database grows with the number of tenants, leading in cases with a large number of tenants to database too large to be handled by devices with low memory and processing means such as smart chips. In addition, when the management of secrets is shared between multiple devices, each device must hold a copy of the database and all these copies must remain synchronized in real time.

Consequently, there is a need for a method enable a secure management of secrets in a hierarchical multi-tenants environment, enabling a one-way only permeability of secrets, without maintaining a tenant database.

SUMMARY OF THE INVENTION

For this purpose and according to a first aspect, this invention relates to a method of securely using a first tenant secret key stored under an encrypted form in a first token of a first tenant identified by a first tenant identifier and having said first tenant secret key, wherein:
each tenant identifier for a tenant comprises a first value and, when said tenant is allowed to use a secret key of a parent tenant identified by a parent tenant identifier, said parent tenant identifier, appended before said first value, and said first token has been generated from said first tenant identifier and a first tenant secret key encrypted with said first tenant identifier and with a first tenant customer master key, said first tenant customer master key having been derived from said first tenant identifier and a secure domain master key, said method comprising the following steps performed by a secure device storing said secure domain master key, on request of a second tenant identified by a second tenant identifier:
getting a first tenant identifier of said first tenant from said first token,
checking if the first tenant identifier is a prefix of or is equal to said second tenant identifier,
when said first tenant identifier is a prefix of or is equal to said second tenant identifier, recovering said first tenant secret key stored in said first token and using it for the second tenant.

Such a generation of a tenant identifier enables to include the hierarchical relationship between a tenant and his parent tenant in the tenant's identifier. The relationship between two tenants may then be verified only by comparing the identifiers of the tenants, without maintaining a hierarchical tenants database.

Moreover, such a generation of a token enables to protect the secret key of the tenant under an encrypted form in the token and ensures that only the secure device storing the secure domain master key can access the secret key of the tenant by decrypting it from the token.

Finally, such a method enables to allow the second tenant to use the secret key of the first tenant, through the secure device, only if the tenant identifier of the second tenant proves that he is a subtenant of the first tenant. It also ensures a one-way only permeability of secrets since the parent tenant A is not a subtenant of his subtenant B.

Said first values may be generated at random.

The method according to the first aspect may comprise, prior to said checking, an authentication by the secure device of said second tenant requesting the use of said first tenant secret key.

It enables the secure device to verify the identity of the second tenant before using the first tenant secret key for the second tenant, therefore avoiding attacks by identity theft.

Recovering said first tenant secret key may comprise:
recovering said first tenant customer master key of said first tenant from said first tenant identifier stored in the first token and from said secure domain master key,
obtaining the first tenant secret key of the first tenant by decrypting with the recovered first tenant customer master key said encrypted first tenant secret key of said first tenant stored in the first token.

In a first embodiment, using said first tenant secret key of said first tenant is performed for said second tenant requesting a decryption of a secret of said first tenant, encrypted with said first tenant secret key, and comprises:
decrypting said secret with said first tenant secret key,
sending said decrypted secret to said second tenant.

It enables the first tenant to share a secret protected by encryption with any of his subtenants, while ensuring that any tenant not being a subtenant of the first tenant is not able to decrypt the secret.

In a second embodiment, using said first tenant secret key of said first tenant is performed for said second tenant requesting a transciphering of a secret of said first tenant encrypted with said first tenant secret key, and comprises:

obtaining a second token generated for the second tenant from said second tenant identifier and from a second tenant secret key encrypted with said second tenant identifier and with a second tenant customer master key, said second tenant customer master key having been derived from said second tenant identifier and a secure domain master key, decrypting said encrypted secret with said first tenant secret key, recovering a second tenant customer master key of said second tenant from said second tenant identifier stored in the second token and from said secure domain master key, obtaining said second tenant secret key of the second tenant by decrypting with the recovered second tenant customer master key said encrypted second tenant secret key of said second tenant stored in the second token, encrypting said decrypted secret with said second tenant secret key of said second tenant, sending said secret encrypted with said second tenant secret key to said second tenant.

It enables the first tenant to share a secret protected by encryption with any of his subtenants, while ensuring that any tenant not being a subtenant of the first tenant is not able to decrypt the secret. In addition, it keeps the secret encrypted up to its reception by the subtenants, avoiding eavesdropping attacks.

Said secret may be a shared secret key of the first tenant.

In a third embodiment wherein the second tenant has a secret, using said first tenant secret key of said first tenant is performed for said second tenant requesting an encryption of said secret with said first tenant secret key, and comprises:

encrypting said secret of the second tenant with said first tenant secret key, sending said encrypted secret of the second tenant to said second tenant.

It enables a subtenant to use the secret key of his parent tenant for encrypting his own secret. It enables then this subtenant to share his secret with the parent tenant and all its sub-tenants.

According to a second aspect, this invention relates to a computer program product directly loadable into the memory of at least one computer, comprising software code instructions for performing the steps of the method according to the first aspect when said product is run on the computer.

According to a third aspect, this invention relates to a secure device comprising a processor, a memory and an interface configured to perform the steps of the method according to the first aspect.

To the accomplishment of the foregoing and related ends, one or more embodiments comprise the features hereinafter fully described and particularly pointed out in the claims.

BRIEF DESCRIPTION OF THE DRAWINGS

The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION OF EMBODIMENTS OF THE INVENTION

In the description detailed below, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The description detailed below is, therefore, not to be taken in a limiting sense, and the scope of the present invention is defined only by the appended claims, appropriately interpreted, along with the full range of equivalents to which the claims are entitled.

Figure 1:
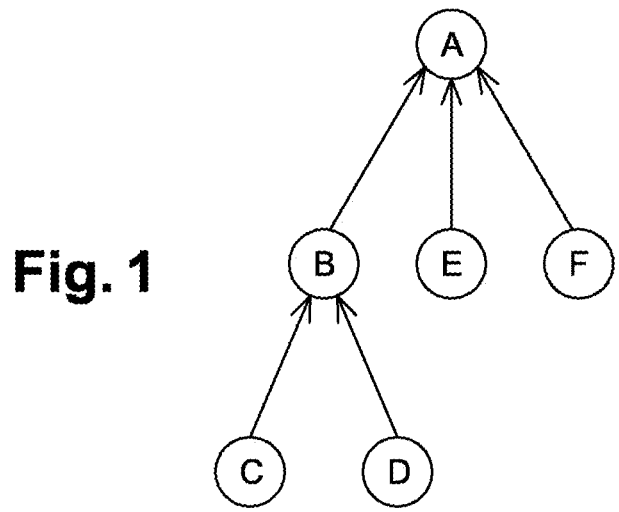
FIG. 1 is a schematic illustration of a tenants tree according to an embodiment of the present invention.

The invention aims at enabling a one way permeability of secrets between at least two tenants. In a hierarchical environment, each tenant may have a secret and may have one or more sub-tenants, as represented in FIG. 1. On this figure, the tenant A has three subtenants, B, E and F. And the tenant B himself has two subtenants C and D. Each tenant can then be called the parent tenant of his sub-tenants. For example tenant A is the parent tenant of tenants B, E and F. The method according to the invention may be used in order to enable each subtenant to use only the secrets of his ancestors, apart from his own secret. Especially, a tenant should not be able to use the secret of his own subtenants. In the example depicted in FIG. 1, the tenant B shall be able to use the secret of his parent tenant A but neither the secrets of his subtenants C and D, nor the secrets of tenants E and F.

In order to do so, the secret of each tenant may be securely stored under an encrypted format in a token generated by a secure device SD. Only the secure device SD may then access such secrets. In the following paragraphs, it is assumed in a non-limiting way that the secrets of tenants usable by their subtenants and stored in such tokens are secret keys for performing cryptographic operations.

Figure 2:
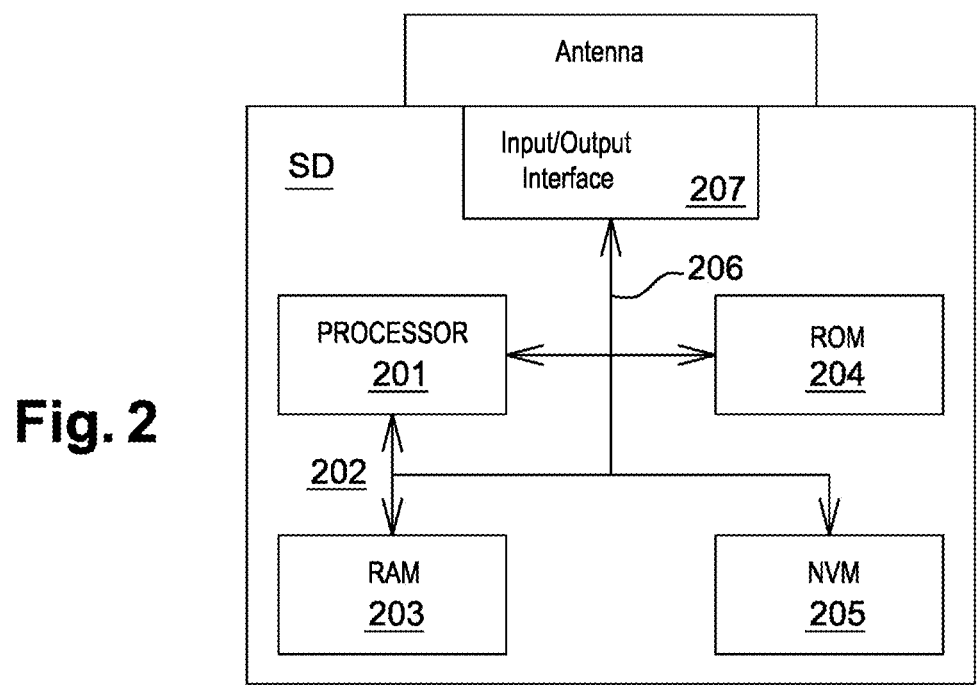
FIG. 2 is a schematic illustration of a secure device according to an embodiment of the present invention.

Such a secure device may for example be a smart card, a SIM card. . . . As represented on FIG. 2, the secure device SD may include a processor 201 connected via a bus 202 to a random access memory (RAM) 203, a read-only memory (ROM) 204, and/or a non-volatile memory (NVM) 205. The secure device SD may further include a connector 206 connected to the processor and by which the secure device may be connected to an antenna. Such an antenna may be used to connect the secure device to various forms of wireless networks, e.g., wide-area networks, WiFi networks, or mobile telephony networks. Alternatively, the secure device may be in communication with an external device such as a card reader by establishing an electrical contact through one or more pins.

Figure 3:
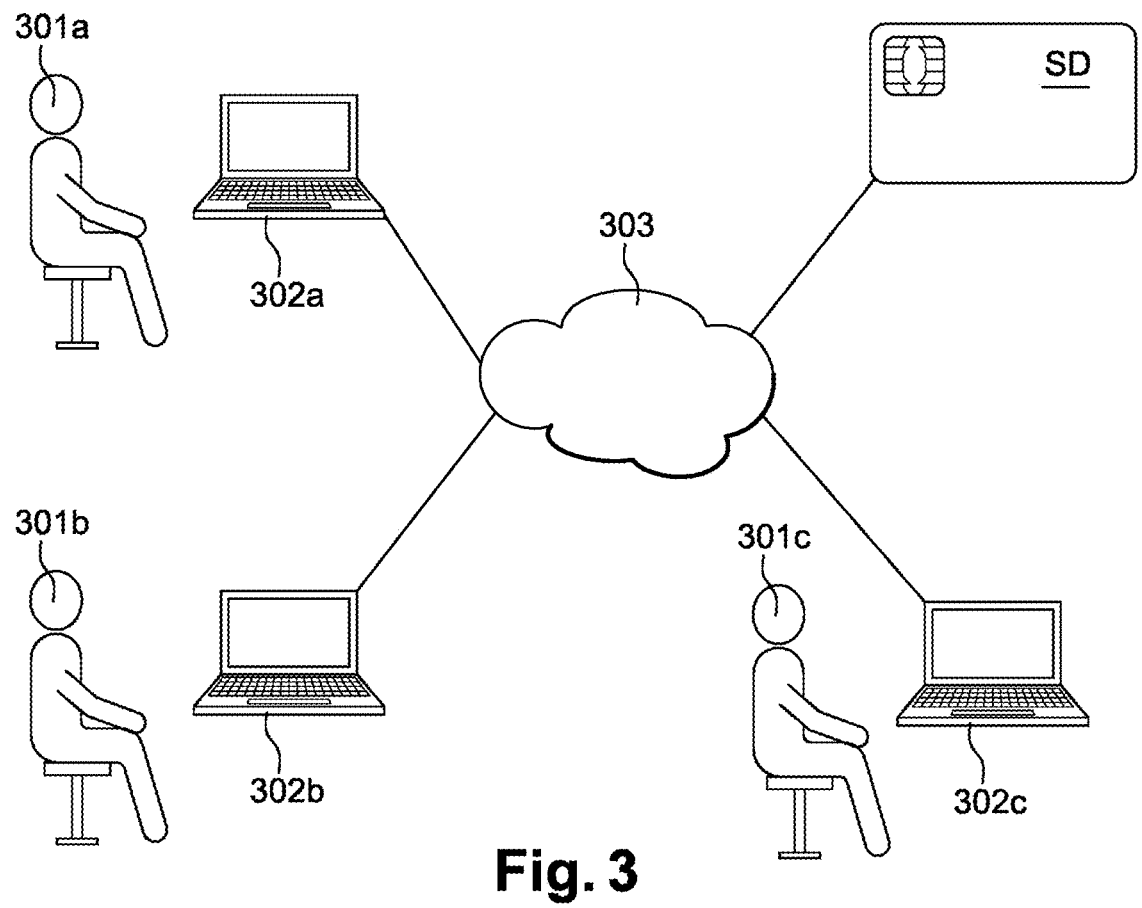
FIG. 3 is a schematic illustration of a system according to an embodiment of the present invention.

Any tenant may send to the secure device a request to use for him the secret of another tenant stored in a token. As represented on FIG. 3, such a request may be sent by a user 301a, b, c . . . representing the requesting tenant through a tenant device 302a, b, c . . . . Such a tenant device may be any electronic device, such as a mobile phone, a tablet, or a personal computer, connected to the secure device SD by a communication network 303 such as an Ethernet network or a wireless network.

Tenant Identifier Generation

In such a multi-tenant environment, each tenant may be identified by a tenant identifier generated by the secure device. An idea of the invention is to make the identifier of a tenant include the identifier of his parent tenant if any; and then to check if a requesting tenant has the rights to use the secret of another tenant by comparing their tenants identifiers in order to determine if the requesting tenant is a subtenant of this other tenant.

More precisely, first, the secure device SD generates a tenant identifier $UID_T$ for each tenant T, said tenant identifier $UID_T$ comprising:
- a first value,
- and, when said tenant T is allowed to use a secret key of a parent tenant $T_P$ identified by a parent tenant identifier $UID_{TP}$, said parent tenant identifier appended before said first value.

In an embodiment said first value may be generated at random by the secure device SD.

By doing so the tenant identifier generated for a tenant begins with the identifiers of his parent tenant if there is one. If the tenant is located several hierarchical levels below the root tenant of the hierarchy, the tenant identifier even begins with the identifiers of all his ancestors in the hierarchy.

For example in the case depicted in FIG. 1, the tenant identifier $UID_A$ of tenant A is just a random value $random_A$.

The tenant identifiers $UID_B$ of tenant B, $UID_E$ of tenant E and $UID_F$ of tenant F are all equal to the tenant identifier $UID_A$ of their parent tenant A followed by a random value $random_B$, $random_E$ or $random_F$.

The tenant identifier $UID_C$ of tenant C is equal to $UID_B|random_C$ which is also equal to $UID_A|random_B|random_C$ where | is the concatenation operation. $UID_C$ begins at the same time with $UID_B$ and $UID_A$: it begins with the identifiers of all his ancestors.

Using such identifiers, it is very easy for the secure device to determine if a tenant is the sub-tenant of another tenant, and therefore if he has the rights to use the secret of this other tenant.

Token Generation

Figure 4:
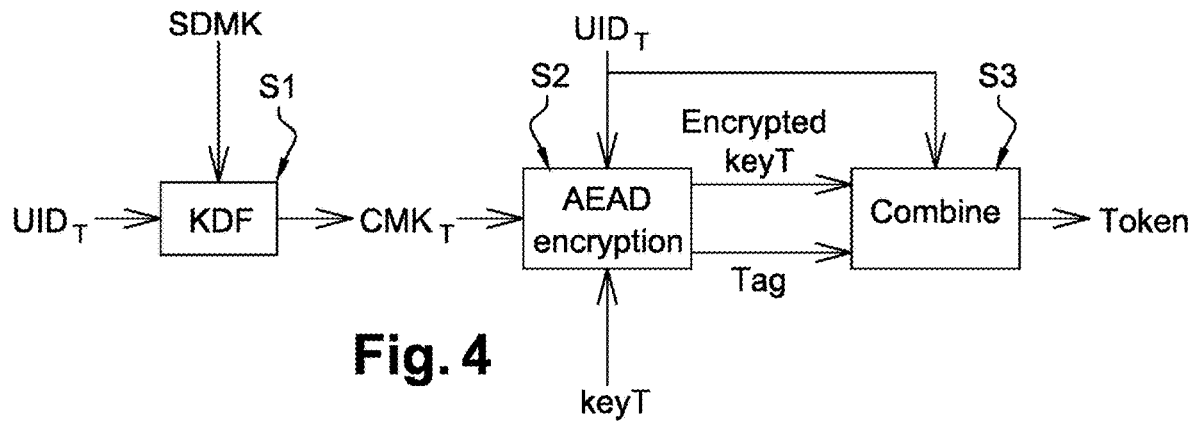
FIG. 4 illustrates schematically a method of generating a token according to an embodiment of the present invention.

In order to make the secret of a tenant accessible only to the secure device SD, secondly, the secure device generates a token TK for each tenant T, identified by a tenant identifier $UID_T$ generated as described here above, and having a secret key keyT. In order to perform such a token generation, the secure device SD stores a secure domain master key SDMK. As described on FIG. 4, said token generation method comprises the steps of:
- deriving S1 a tenant customer master key $CMK_T$ from said tenant identifier $UID_T$ and said secure domain master key SDMK. Such a derivation may be performed using a key derivation function KDF such as a HMAC based KDF, using the secure domain master key SDMK as master key,
- encrypting S2 said secret key of said tenant T with said tenant customer master key $CMK_T$ and said tenant identifier $UID_T$. Such an encryption may be performed using an Authenticated Encryption with Associated Data AEAD encryption process using the tenant identifier $UID_T$ as associated data, for example using AES-GCM (AES-Galois/Counter Mode (GCM)) authenticated encryption. In the following paragraphs, it is supposed that such an encryption process is a symmetric key encryption,
- generating S3 said token TK from said encrypted secret key and said tenant identifier $UID_T$. The token TK may for example be generated by concatenating said encrypted secret key and said tenant identifier $UID_T$. When the secret key of the tenant T is encrypted by an AEAD process, such a token may also include an authentication tag generated by the AEAD process.

Since only the secure device knows the secure domain master key SDMK, only the secure device SD can retrieve the tenant customer master key of a tenant and decrypt the encrypted secret key of said tenant.

Such tokens may be securely publicly shared between all the tenants and the secure device. The secure device may store a copy of each generated token. Alternatively, such tokens may be stored in an online public repository and the secure device may access this repository through the communication network 303 when he needs to get a specific token of a tenant.

Subtenant B Using Parent Tenant A Secret Key: Main Steps

According to a first aspect, the invention relates to a method of securely using a first tenant secret key stored under an encrypted form in a first token TKA of a first tenant A generated as described here above.

Figure 5:
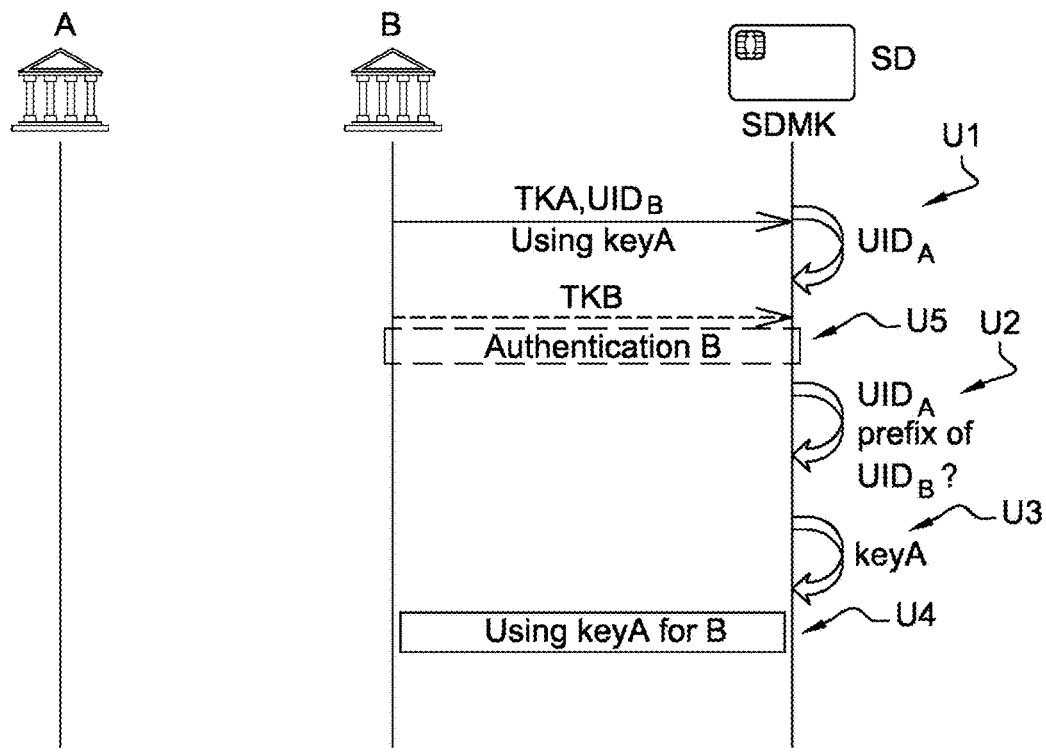
FIG. 5 illustrates schematically a method of securely using a first tenant secret key stored under an encrypted form in a first token of a first tenant according to an embodiment of the present invention.

As described on FIG. 5, this method comprises the following steps performed by the secure device storing the secure domain master key SDMK, on request of a second tenant B identified by a second tenant identifier $UID_B$:
- getting U1 a first tenant identifier $UID_A$ of said first tenant A from said first token TKA. The first token may be sent to the secure device by the second tenant B,
- checking U2 if the first tenant identifier $UID_A$ is a prefix of or is equal to said second tenant identifier $UID_B$,
- when said first tenant identifier $UID_A$ is a prefix of or is equal to said second tenant identifier $UID_B$, recovering U3 said first tenant secret key keyA stored in said first token TKA and using it U4 for the second tenant B as requested.

By doing so, the secure device is able to determine if the second tenant B is a sub-tenant of the first tenant A and, in that case only, to use the secret key keyA of the first tenant A for the second tenant B, as requested by the second tenant B. The secure device does not need to access any database memorizing the hierarchical relationship between the first tenant A and the second tenant B.

Such a method also allows a tenant T to request the secure device to use his own secret key keyT because said tenant identifier $UID_T$ is equal to said tenant identifier $UID_T$ and thus the step of checking U2 is going to be a success.

In the example depicted in FIG. 1, the user device will allow the tenant C to use the secret key of the tenant B but he will deny the tenant E the right to use the secret of the tenant B since the tenant E is not a subtenant of the tenant B and his tenant identifier $UID_E$ hasn't the tenant identifier $UID_B$ of the tenant B as a prefix.

In an embodiment the second tenant B requesting usage of the secret key of the first tenant A may provide the secure device with his tenant identifier $UID_B$, possibly in a second token TKB generated for the second tenant as the first token generation for the first tenant is described here above.

Alternatively, in order to prevent an attacker from using a forge tenant identifier or the identifier of another tenant than himself, the method may comprise, prior to said checking, an authentication U5 by the secure device of said second tenant B requesting the use of said first tenant secret key. As an example, such authentication may be performed using PKCS#11 standard. A different slot may be assigned to each tenant and may comprise a private object playing the role of identifier of the tenant assigned to the slot. In order to authenticate a tenant, such a private object may appear in the slot only after the tenant authenticates himself by providing login/password data.

Figure 6:
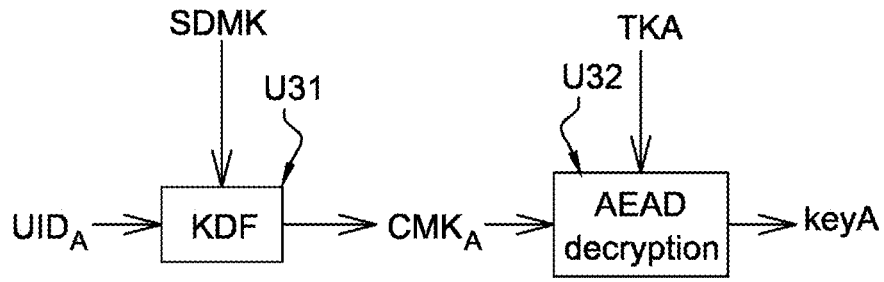
FIG. 6 illustrates schematically a method of recovering a tenant secret key stored under an encrypted form in a first token according to an embodiment of the present invention.

In an embodiment illustrated on FIG. 6, recovering U3 said first tenant secret key may comprise:
- recovering U31 said first tenant customer master key $CMK_A$ of said first tenant A from said first tenant identifier $UID_A$ stored in the first token TKA and from said secure domain master key SDMK. Such an operation shall be performed using the same operation as the one used to derive the first tenant customer master key $CMK_A$ when generating the first token TKA,
- obtaining U32 the first tenant secret key of the first tenant A by decrypting with the recovered first tenant customer master key $CMK_A$ said encrypted first tenant secret key of said first tenant A stored in the first token TKA. Such a decryption may be performed using an Authenticated Decryption with Associated Data AEAD decryption process using the tenant identifier $UID_A$ as associated data, for example using AES-GCM (AES-Galois/Counter Mode (GCM)) authenticated decryption.

Use-Case: Decrypting Secret of Parent A for Subtenant B

Figure 7:
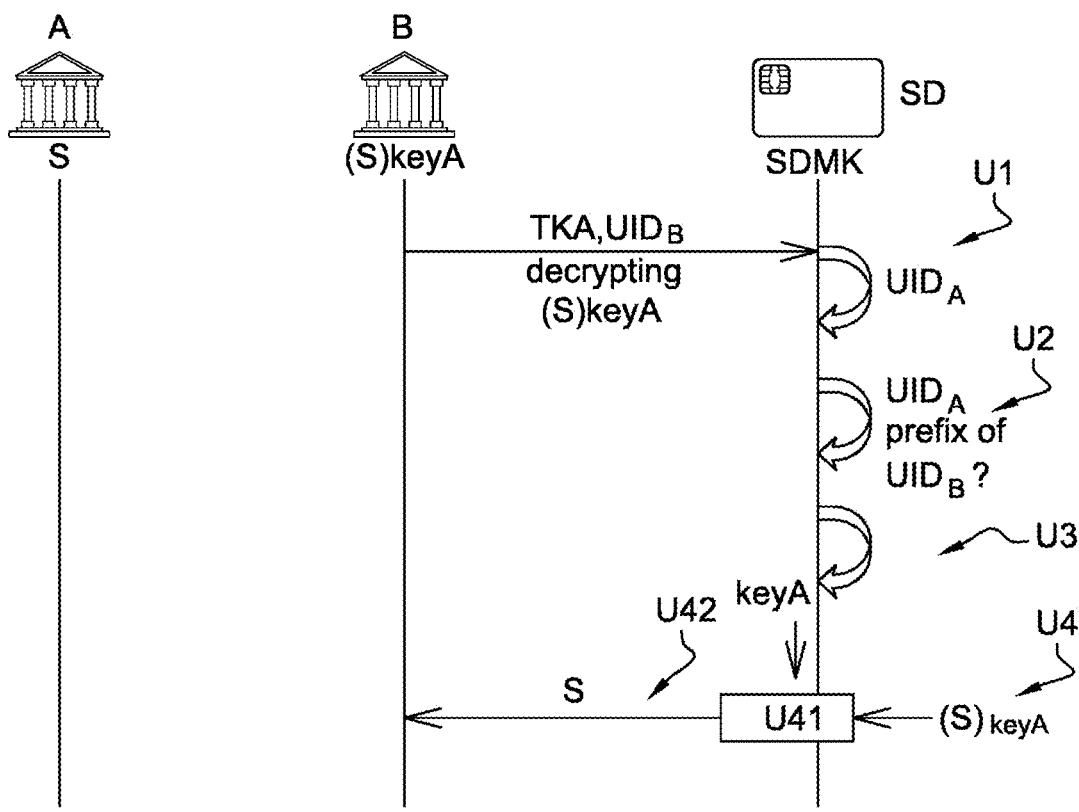
FIG. 7 illustrates schematically a method of securely decrypting a secret of a first tenant encrypted with said first tenant secret key according to another embodiment of the present invention.

In an embodiment, as illustrated on FIG. 7, the method described here above may be used in order to share a secret S from the first tenant A to the second tenant B, his subtenant. In such a case, the secret S of the first tenant A may be shared between the first tenant A and the second tenant B encrypted with the first tenant secret key keyA. The second tenant B may then request the secure device SD to use the first tenant secret key keyA to decrypt the encrypted secret. The step of using U4 the first tenant secret key for the second tenant B requesting the decryption of the secret S of said first tenant A, encrypted with said first tenant secret key keyA, performed by the secure device SD only when the second tenant B is a subtenant of the first tenant A, may then comprise:
- decrypting U41 said secret S with said first tenant secret key keyA. The encrypted secret may be previously provided to the secure device SD by the second tenant B,
- and sending U42 said decrypted secret to said second tenant B.

Doing so enables the second tenant B to get knowledge of the secret S shared by the first tenant A, only if the second tenant B is a subtenant of the first tenant A. If any other tenant being not a subtenant of the first tenant A requested the secure device to decrypt the secret S, the secure device would determine by comparing their tenant identifiers that the requesting tenant is not a subtenant of the first tenant A and would refuse to decrypt the secret S.

Use-Case: Transciphering Secret of Parent A for Subtenant B keyA->keyB

Figure 8:
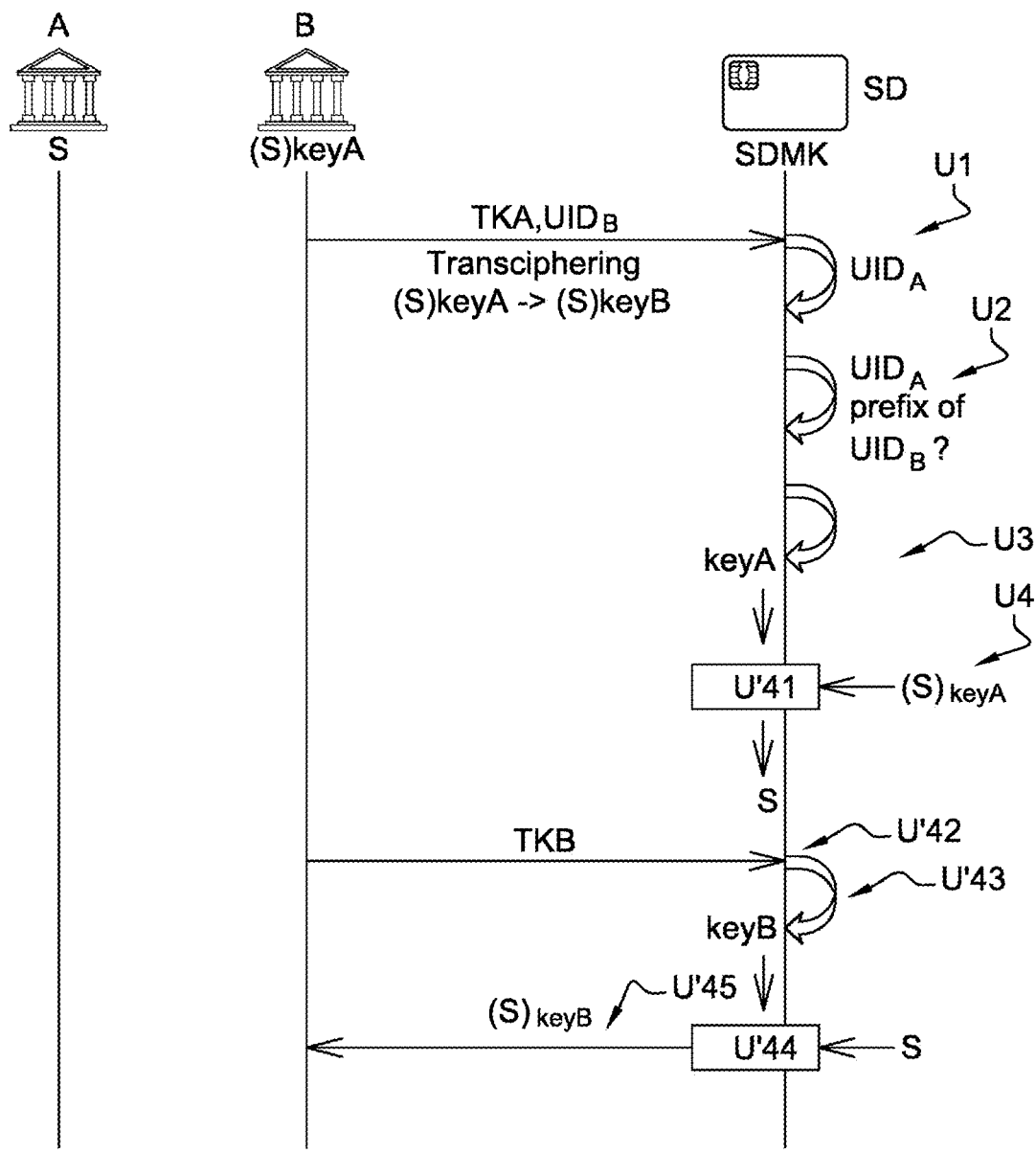
FIG. 8 illustrates schematically a method of securely transciphering with a second tenant secret key of a secret of a first tenant encrypted with said first tenant secret key according to another embodiment of the present invention.

In order to avoid sending the decrypted secret on the communication network 303 between the secure device and the tenant device 302 of the second tenant B, the method may include a transciphering of the secret in an alternative embodiment described on FIG. 8. Such a transciphering aims at changing the key used to encrypt the secret, from the first tenant secret key keyA to the second tenant secret key keyB. The step of using U4 the first tenant secret key for the second tenant B, requesting a transciphering of the secret S of said first tenant A encrypted with said first tenant secret key keyA, performed by the secure device SD only when the second tenant B is a subtenant of the first tenant A, may then comprise:
- decrypting U'41 said secret S with said first tenant secret key keyA. The encrypted secret may be previously provided to the secure device SD by the second tenant B.
- obtaining U'42 a second token TKB generated for the second tenant from an encrypted second tenant secret key keyB and from said second tenant identifier $UID_B$ as described here above. The second token TKB may be provided by the second tenant B.
- recovering U'43 said second tenant secret key keyB as illustrated on the FIG. 6 by:
  - recovering a second tenant customer master key $CMK_B$ of said second tenant B from said second tenant identifier $UID_B$ stored in the second token TKB and from said secure domain master key SDMK. Such an operation shall be performed using the same operation as the one used to derive the second tenant customer master key $CMK_B$ when generating the second token TKB,
  - obtaining said second tenant secret key keyB of the second tenant B by decrypting with the recovered second tenant customer master key $CMK_B$ said encrypted second tenant secret key of said second tenant B stored in the second token TKB,
- encrypting U'44 said decrypted secret S with said second tenant secret key keyB of said second tenant B,
- sending U'45 said secret encrypted with said second tenant secret key keyB to said second tenant B.

It enables the second tenant B to get the secret S of the first tenant A under a format that he can decrypt himself. As the secret is only transmitted between the secure device SD and the second tenant under an encrypted form, it remains protected against any man in the middle attack.

In an embodiment such a secret S of the first tenant may be a shared secret key of the first tenant. In the case of tenants in the banking sector, such a method would enable a national bank A for example to securely transmit to a subsidiary B such a shared secret key, to be used in the future by the subsidiary, encrypted with his national bank secret key. The subsidiary being a subtenant of the national bank could request the secure device to decrypt the shared secret key and to send him the decrypted shared secret key, possibly after encrypting it with the subsidiary secret key.

Use-Case: Encrypting Secret of Subtenant B on Request from Subtenant B

Figure 9:
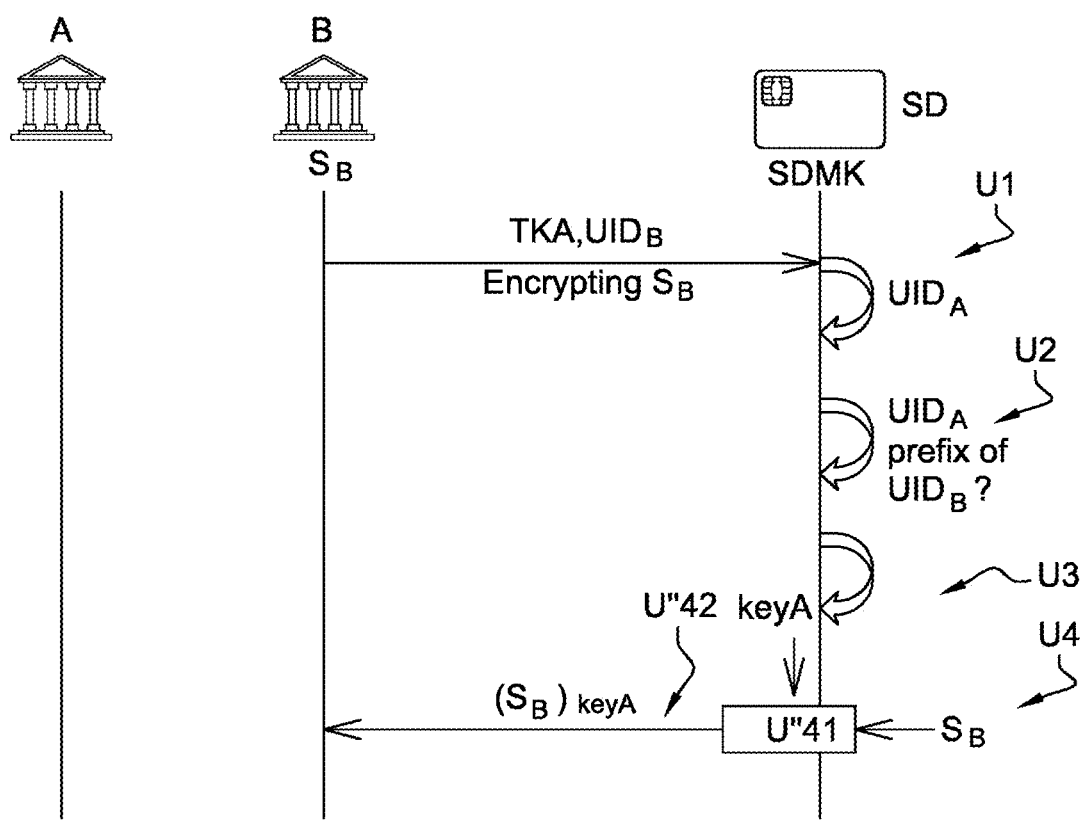
FIG. 9 illustrates schematically a method of securely encrypting of a secret of a second tenant with a first tenant secret key according to another embodiment of the present invention.

In an embodiment, the method according to the first aspect may be used in order to allow the second tenant B to encrypt a secret he owns $S_B$ with a secret key of his parent tenant A, as described on FIG. 9. In order to do so, the step of using U4 the first tenant secret key for the second tenant B requesting an encryption of said secret $S_B$ with said first tenant secret key keyA, performed by the secure device SD only when the second tenant B is a subtenant of the first tenant A, may comprise:

encrypting U"41 said secret $S_B$ of the second tenant B with said first tenant secret key keyA. The secret $S_B$ of the second tenant B may be previously provided to the secure device SD by the second tenant B, sending U"42 said encrypted secret of the second tenant to said second tenant B. According to another embodiment, said encrypted secret may be sent also to said tenant A and its subtenants.

Figure 10A:
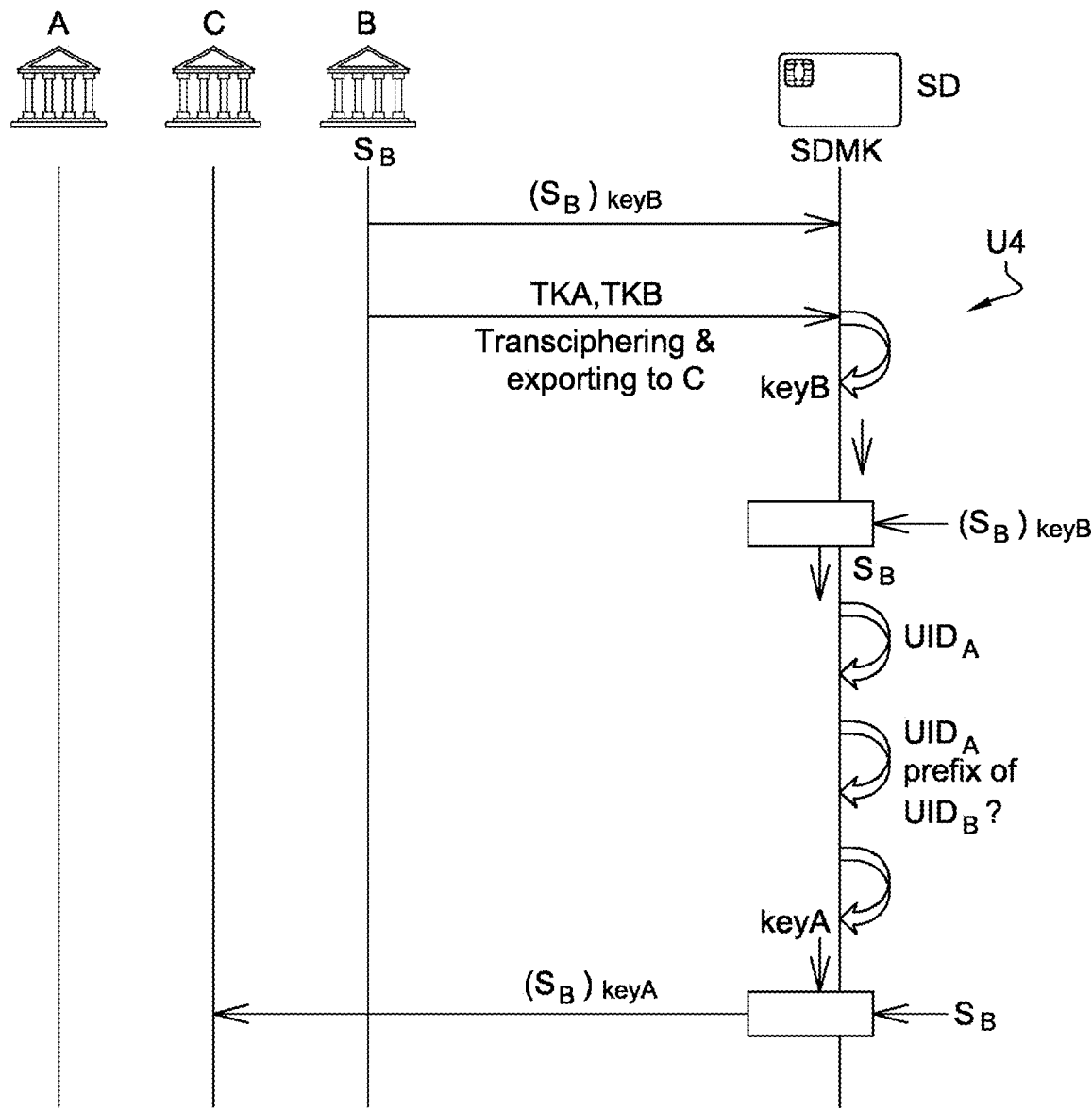
FIGS. 10a and 10b illustrate schematically a method of securely sharing of a secret of a second tenant with a third tenant by using a first tenant secret key according to another embodiment of the present invention.

Use-Case: Transciphering Secret of Subtenant B on Request from Subtenant B keyB->keyA In order to avoid sending in plain text the secret of the second tenant on the communication network 303 between the secure device and the tenant device 302 of the second tenant B, the method may include a transciphering of the secret of the second tenant in an alternative embodiment described on FIG. 10a. The second tenant may send is second tenant encrypted with the second tenant secret key keyB and the secure device may then perform a transciphering from the second tenant secret key keyB to the first tenant secret key keyA by:

performing the steps U'42 and U'43 described here above for recovering the second tenant secret key, performing the step U'41 described here above with the second tenant secret key keyB instead of the first tenant secret key keyA for decrypting the encrypted secret, performing the steps U"41 and U"42 for encrypting the secret with the first tenant secret key keyA and sending back the result.

Use-Case: Decrypting Secret of Subtenant B for Subtenant C

Figure 10B:
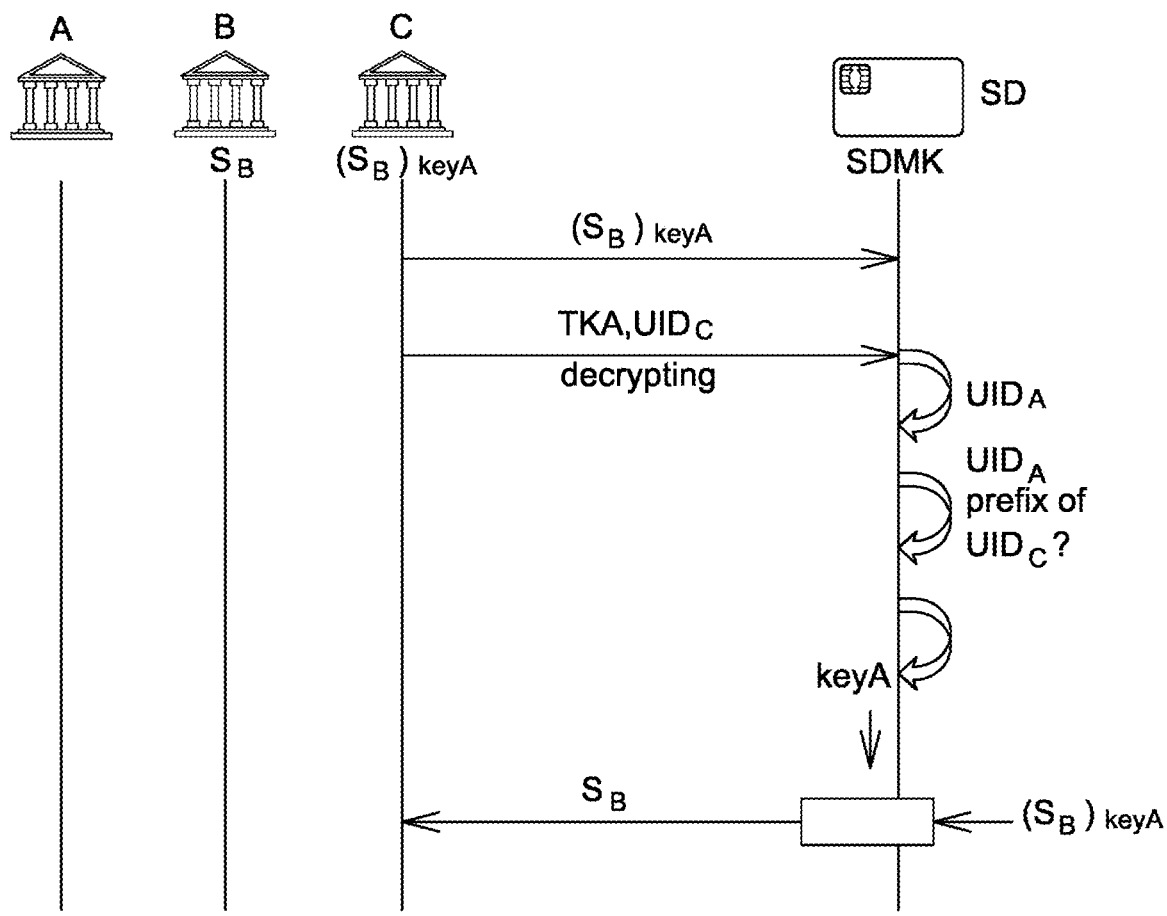

Such an encryption of a secret of the second tenant with the first tenant secret key enables the second tenant to export this secret to a third tenant C identified by a third tenant identifier $UID_C$ and also subtenant of the first tenant A. The second tenant B may transmit his secret $S_B$ encrypted with the first tenant secret key to the third tenant. Being also a subtenant of the first tenant A, the third tenant C holding said encrypted secret of the second tenant $S_B$ may then request the secure device to use the secret key of the first tenant keyA for him in order to decrypt the encrypted secret transmitted by the second tenant B as illustrated on FIG. 10b.

In order to do so, the secure device may simply perform the steps U1, U2, U3, U41 and U42 described here above in which the third tenant C plays the role of the second tenant B.

Use-Case: Transciphering Secret of Subtenant B for Subtenant C keyA->keyC

In order to avoid sending the decrypted secret on the communication network 303 between the secure device and the tenant device 302 of the third tenant C, the method may include a transciphering of the secret from the first tenant secret key keyA to a third tenant secret key keyC. After performing the step U41, the secure device may then:

performing the steps U'42 and U'43 described here above with the third tenant C playing the role of the second tenant B for recovering the third tenant secret key keyC, encrypt the secret with the third tenant secret key, send the encrypted secret to the third tenant.

It enables the third tenant C to get the secret $S_B$ of the second tenant B under a format that he can decrypt himself. As the secret is only transmitted between the secure device SD and the third tenant under an encrypted form, it remains protected against any man in the middle attack.

In one embodiment, several secure devices may be connected to the communication network 303. In order to enable all these secure devices to perform any of the steps described here above, all these secure devices may store the same secure domain master key SDMK. Doing so enables each of these secure devices to recover the tenant customer master key CMK and then the secure key of any tenant based on his token. It enables the permeability of secrets in the multi-tenant environment to be managed by several secure devices without needing to synchronize in real time any data between the secure devices.

According to a second aspect, the invention also relates to a computer program product directly loadable into the memory of at least one computer, comprising software code instructions for performing the steps of the previous method when said product is run on the computer.

As a result, the method described here above enables a secure management of secrets in a hierarchical multi-tenants environment, enabling a one-way only permeability of secrets, without maintaining a tenant hierarchical database.

The invention claimed is:

1. A method of securely using, by a second tenant, a first tenant secret key stored under an encrypted form in a first token of a first tenant identified by a first tenant identifier and having said first tenant secret key, wherein: each tenant is identified by a tenant identifier, wherein each tenant identifier comprises a first value and, when said tenant is allowed to use a secret key of a parent tenant identified by a parent tenant identifier, said parent tenant identifier, appended before said first value, and said first token has been generated from said first tenant identifier and the first tenant secret key encrypted with said first tenant identifier and with a first tenant customer master key, said first tenant customer master key having been derived from said first tenant identifier and a secure domain master key, said method comprising the following steps performed by a secure device:

storing said secure domain master key, wherein the domain master key is stored only on said secure device, and said secure device, on request of a second tenant identified by a second tenant identifier:

retrieving the first tenant identifier and the encrypted first tenant secret key of said first tenant from said first token, checking if the first tenant identifier is a prefix of or is equal to said second tenant identifier, when said first tenant identifier is a prefix of or is equal to said second tenant identifier, recovering from said first token said first tenant secret key stored in said first token by:
- deriving the first tenant customer master key from the first tenant identifier retrieved from said first token and from said secure domain master key, and
- obtaining said first tenant secret key by decrypting said encrypted first tenant secret key with said derived first tenant customer master key thereby recovering the first tenant secret key, and
using the first tenant secret key for the second tenant to perform a cryptographic operation on behalf of the second tenant.

2. The method of the claim 1, wherein said first values are generated at random.

3. The method of claim 1, comprising, prior to said checking, an authentication by the secure device of said second tenant requesting the use of said first tenant secret key.

4. The method of the claim 1, wherein said request of the second tenant is using said first tenant secret key of said first tenant to perform a decryption of a secret of said first tenant, encrypted with said first tenant secret key, and using the first tenant secret key to perform a cryptographic operation on behalf of the second tenant comprises:
decrypting said secret with said first tenant secret key, sending said decrypted secret to said second tenant.

5. The method of the claim 1, wherein said request of the second tenant is using said first tenant secret key of said first tenant to perform a transciphering of a secret of said first tenant encrypted with said first tenant secret key, and using the first tenant secret key to perform a cryptographic operation on behalf of the second tenant comprises:
- obtaining a second token generated for the second tenant from said second tenant identifier and from a second tenant secret key encrypted with said second tenant identifier and with a second tenant customer master key, said second tenant customer master key having been derived from said second tenant identifier and a secure domain master key,
- decrypting said encrypted secret with said first tenant secret key,
- recovering the second tenant customer master key of said second tenant from said second tenant identifier stored in the second token and from said secure domain master key,
- obtaining said second tenant secret key of the second tenant by decrypting with the recovered second tenant customer master key said encrypted second tenant secret key of said second tenant stored in the second token,
- encrypting said decrypted secret with said second tenant secret key of said second tenant,
- sending said secret encrypted with said second tenant secret key to said second tenant.

6. The method of the claim 4, wherein said secret is a shared secret key of the first tenant.

7. The method of the claim 1, wherein the second tenant has a secret and wherein using said first tenant secret key of said first tenant is performed for said second tenant requesting an encryption of said secret with said first tenant secret key, and comprises:
- encrypting said secret of the second tenant with said first tenant secret key,
- sending said encrypted secret of the second tenant to said second tenant.

8. A nontransitory computer readable memory comprising a computer program product directly loadable into the nontransitory computer readable memory of a secure device, comprising software code instructions for performing when said computer program product is run on the secure device, a method of securely using, by a second tenant, a first tenant secret key stored under an encrypted form in a first token of a first tenant identified by a first tenant identifier and having said first tenant secret key,
wherein: each tenant is identified by a tenant identifier, wherein
each tenant identifier comprises a first value and, when said tenant is allowed to use a secret key of a parent tenant identified by a parent tenant identifier, said parent tenant identifier, appended before said first value,
and said first token has been generated from said first tenant identifier and the first tenant secret key encrypted with said first tenant identifier and with a first tenant customer master key, said first tenant customer master key having been derived from said first tenant identifier and a secure domain master key,
said method including the following steps:
storing said secure domain master key only on said secure device, and
said secure device, on request of a second tenant identified by a second tenant identifier:
- retrieving the first tenant identifier of said first tenant from said first token,
- checking if the first tenant identifier is a prefix of or is equal to said second tenant identifier,
- when said first tenant identifier is a prefix of or is equal to said second tenant identifier, recovering from said first token said first tenant secret key stored in said first token by:
  - deriving the first tenant customer master key from the first tenant identifier retrieved from said first token and from said secure domain master key, and
  - obtaining said first tenant secret key by decrypting said encrypted first tenant secret key with said derived first tenant customer master key thereby recovering the first tenant secret key, and
using the first tenant secret key for the second tenant to perform a cryptographic operation on behalf of the second tenant.

9. A secure device comprising a processor, a memory and an interface configured to perform a method of securely using, by a second tenant, a first tenant, secret key stored under an encrypted form in a first token of a first tenant identified by a first tenant identifier and having said first tenant secret key,
wherein: each tenant is identified by a tenant identifier, wherein
each tenant identifier comprises a first value and, when said tenant is allowed to use a secret key of a parent tenant identified by a parent tenant identifier, said parent tenant identifier, appended before said first value,
and said first token has been generated from said first tenant identifier and the first tenant secret key encrypted with said first tenant identifier and with a first tenant customer master key, said first tenant customer master key having been derived from said first tenant identifier and: a secure domain master key, said method including the following steps:
- storing said secure domain master key only on said secure device, and
- said secure device, on request of a second tenant identified by a second tenant identifier:
  - retrieving the first tenant identifier of said first tenant from said first token,
  - checking if the first tenant identifier is a prefix of or is equal to said second tenant identifier,
  - when said first tenant identifier is a prefix of or is equal to said second tenant identifier, recovering from said first token said first tenant secret key stored in said first token by:
    - deriving the first tenant customer master key from the first tenant identifier retrieved from said first token and from said secure domain master key, and
    - obtaining said first tenant secret key by decrypting said encrypted first tenant secret key with said derived first tenant customer master key thereby recovering the first tenant secret key, and
  - using the first tenant secret key for the second tenant to perform a cryptographic operation on behalf of the second tenant.

10. The secure device of claim 9, wherein said first values are generated at random.

11. The secure device of claim 9, configured to, prior to said checking, authenticate said second tenant requesting the use of said first tenant secret key.

12. The secure device of claim 9, wherein said request of the second tenant is using said first tenant secret key of said first tenant to perform a decryption of a secret of said first tenant, encrypted with said first tenant secret key, and using the first tenant secret key to perform a cryptographic operation on behalf of the second tenant comprises:
- decrypting said secret with said first tenant secret key,
- sending said decrypted secret to said second tenant.

13. The secure device of claim 9, wherein said request of the second tenant is using said first tenant secret key of said first tenant to perform a transciphering of a secret of said first tenant encrypted with said first tenant secret key, and using the first tenant secret key to perform a cryptographic operation on behalf of the second tenant comprises:
- obtaining a second token generated for the second tenant from said second tenant identifier and from a second tenant secret key encrypted with said second tenant identifier and with a second tenant customer master key, said second tenant customer master key having been derived from said second tenant identifier and a secure domain master key,
- decrypting said encrypted secret with said first tenant secret key,
- recovering the second tenant customer master key of said second tenant from said second tenant identifier stored in the second token and from said secure domain master key,
- obtaining said second tenant secret key of the second tenant by decrypting with the recovered second tenant customer master key said encrypted second tenant secret key of said second tenant stored in the second token,
- encrypting said decrypted secret with said second tenant secret key of said second tenant,
- sending said secret encrypted with said second tenant secret key to said second tenant.

14. The secure device of claim 12, wherein said secret is a shared secret key of the first tenant.

15. The secure device of claim 12, wherein the second tenant has a secret and wherein using said first tenant secret key of said first tenant is performed for said second tenant requesting an encryption of said secret with said first tenant secret key, and comprises:
- encrypting said secret of the second tenant with said first tenant secret key,
- sending said encrypted secret of the second tenant to said second tenant.

* * * * *